United States Patent
Delaney et al.

(10) Patent No.: US 8,913,603 B2
(45) Date of Patent: Dec. 16, 2014

(54) METHODS AND SYSTEMS FOR AUTOMATIC TIME-BASED ROUTING RULE ADMINISTRATION

(75) Inventors: Robert J. Delaney, Raleigh, NC (US); Todd Eichler, Wake Forest, NC (US); Peter J. Marsico, Chapel Hill, NC (US)

(73) Assignee: Tekelec Global, Inc., Morrisville, NC (US)

(*) Notice: Subject to any disclaimer, the term of this patent is extended or adjusted under 35 U.S.C. 154(b) by 2556 days.

(21) Appl. No.: 10/985,823

(22) Filed: Nov. 10, 2004

(65) Prior Publication Data

US 2005/0122962 A1 Jun. 9, 2005

Related U.S. Application Data

(60) Provisional application No. 60/518,722, filed on Nov. 10, 2003.

(51) Int. Cl.
- H04L 12/66 (2006.01)
- H04Q 3/66 (2006.01)
- H04L 12/741 (2013.01)
- H04Q 3/00 (2006.01)

(52) U.S. Cl.
CPC .............. *H04Q 3/0025* (2013.01); *H04Q 3/66* (2013.01); *H04L 45/54* (2013.01)
USPC ........................................................ 370/352

(58) Field of Classification Search
USPC .............. 370/410.389, 410, 389, 352; 705/1; 455/432.1
See application file for complete search history.

(56) References Cited

U.S. PATENT DOCUMENTS

| | | | |
|---|---|---|---|
| 5,408,464 A * | 4/1995 | Jurkevich | 370/219 |
| 5,606,602 A * | 2/1997 | Johnson et al. | 379/114.02 |
| 5,705,998 A * | 1/1998 | Stampfl | 370/216 |
| 6,078,963 A * | 6/2000 | Civanlar et al. | 709/238 |
| 6,104,799 A | 8/2000 | Jain et al. | |
| 6,438,110 B1 | 8/2002 | Rai et al. | |
| 6,442,258 B1 * | 8/2002 | Mashinsky | 379/114.02 |
| 7,002,973 B2 * | 2/2006 | MeLampy et al. | 370/401 |
| 7,054,328 B2 * | 5/2006 | Prasad et al. | 370/410 |
| 7,408,930 B2 * | 8/2008 | Pathi et al. | 370/389 |
| 2004/0172265 A1 * | 9/2004 | Spragle et al. | 705/1 |
| 2005/0059392 A1 * | 3/2005 | Lankford | 455/432.1 |

OTHER PUBLICATIONS

Notification of Transmittal of The International Search Report or The Declaration corresponding to PCT application No. PCT/US04/37390 dated Jun. 14, 2006.
"Feature Guide Eagle STP," Tekelec, P/N 910-1225-01, Revision B (Jan. 1998).

* cited by examiner

*Primary Examiner* — Sonia Gay
(74) *Attorney, Agent, or Firm* — Jenkins, Wilson, Taylor & Hunt, P.A.

(57) ABSTRACT

Methods and systems for automatic time-based routing rule administration are disclosed. According to one method, routing data for routing messages between a source address and a destination address is stored in a network routing table. A time period is associated with the routing data based on agreements between service providers. Messages are routed between the service providers during the time period. Outside of the time period, routing of messages between the source address and the destination address is automatically inhibited.

39 Claims, 4 Drawing Sheets

US 8,913,603 B2

METHODS AND SYSTEMS FOR AUTOMATIC TIME-BASED ROUTING RULE ADMINISTRATION

RELATED APPLICATIONS

This application claims the benefit of U.S. Provisional Patent Application Ser. No. 60/518,722, filed Nov. 10, 2003, the disclosure of which is incorporated herein by reference in its entirety.

TECHNICAL FIELD

The subject matter described herein relates to methods and systems for automatically administering routing rules. More particularly, the subject matter described herein relates to automatically administering time-based routing rules.

BACKGROUND ART

Signaling hub providers and wholesale carriers provide connection services between companies for a specified time and price. When the agreements change, the routes that were established between the two companies are removed or prevented from allowing messages to pass. More particularly, routing rules maintained in network routing nodes (e.g., SS7 signal transfer points (STPs), SS7/Internet protocol (IP) signaling gateways (SGs), session initiation protocol (SIP) routers, proxies, and gateways, and H.323 routers, proxies, and gateways) must be manually re-provisioned to remove or disable routes corresponding to the expired agreements. Manually reprovisioning routing tables when agreements expire can be difficult, especially if multiple service agreements exit simultaneously.

FIG. 1 is a network diagram illustrating a transit network 100 that routes traffic between other networks 101-106. In FIG. 1, transit network 100 includes STPs 107 and 108 and SSPs 109 and 110 that connect and disconnect each network 101-106 based upon business agreements. For example, for 1 month, network A 101 can connect to network F 106 at a designated rate per call, after which the agreement ends and network A 101 cannot reach network F 106 via transit network 100. The owner of transit network 100 may have made a subsequent agreement with the owners of networks B and E 102 and 105 that takes effect when the network A-F agreement expires. For the agreement with the owners of networks B and E 102 and 105, transit network 100 will need to provision routes into STPs 107 and 108 when the agreement period starts. In addition, trunk group mappings must be provisioned in SSPs 109 and 110. The operator who owns STPs 107 and 108 effectively wholesales its capacity to networks A and F 101 and 106, but only at the appropriate time. When the agreement between network A 101 and network F 106 expires, the transit network operator must remove or inhibit the trunking translations in SSP D 109 and SSP C 110 and also remove or inhibit the routes in STPs 107 and 108. In order to enable routes for new agreements and disable routes for new agreements, the routing tables in STPs 107 and 108 must be manually updated. Such manual updating is time- and labor-intensive, especially when multiple agreements must be simultaneously maintained.

Accordingly, there exists a need for improved methods and systems for administering time-based routing agreements.

DISCLOSURE OF THE INVENTION

The subject matter described herein includes methods and systems for automatic time-based routing rule administration. According to one implementation, routing data for routing messages between a source address and a destination address are stored in a network routing table. A time period is associated with the routing data based on an agreement with a first service provider associated with the source address and a second service provider associated with the destination address. Messages are routed between the source address and the destination address for the time period. In response to expiration of the time period, routing a message between the source address and the destination address is automatically inhibited. Because routes can be automatically inhibited, the need for manually updating routing tables when agreements between carriers expire is reduced.

The time-based routing functions described herein may be implemented in hardware, software, firmware, or any combination thereof. For example, the time-based routing functions described herein may be implemented as computer-executable instructions embodied in a computer-readable medium. Exemplary computer-readable media in which the methods and systems described herein may be implemented include electrical, magnetic or optical storage media, including chip memory devices, optical disks, magnetic disks, and downloadable electrical signals.

Accordingly, it is an object of the subject matter described herein to provide methods and systems for automatically administering time-based routing in a network routing element.

It is another object of the subject matter described herein to provide methods and systems for time-based routing in a network routing node, such as a signal transfer point.

Some of the objects of the subject matter described herein having been stated hereinabove, and which are addressed in whole or in part by the subject matter described herein, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings of which.

DETAILED DESCRIPTION

In one exemplary implementation, the subject matter described herein includes methods and systems for automatically implementing time-based rules in an STP. In the example illustrated in FIG. 1, STPs 107 and 108 may each be modified to include time-based routing tables in which entries include expiration times. When performing a route table lookup, a routing function within STP 107 or 108 may check the expiration time associated with an entry that matches the originating point code (OPC) and destination point code (DPC) in a received message. If the time has not expired, the message is routed to its destination. If the time has expired, the message may be dropped. To better manage route table size, the routing function may automatically scan its route table for expired entries and discard the entries if the expiration times are expired.

Figure 1:
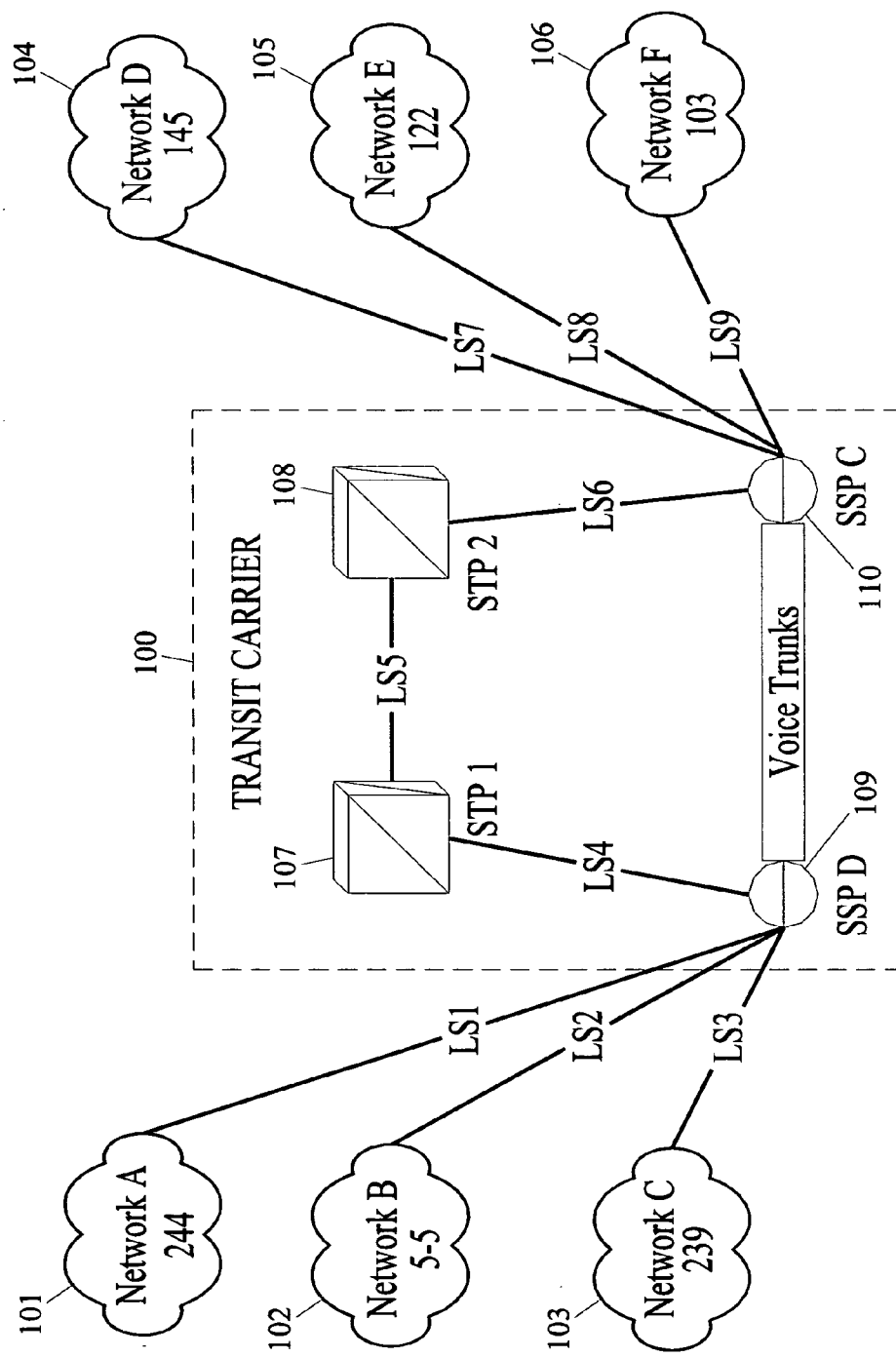
FIG. 1 is a network diagram illustrating a transit network that routes messages between other networks.

In FIG. 1, STPs 107 and 108 may include automatic time-based routing rule capabilities, and routing rules may be automatically removed when service agreements expire. Although SSPs 109 and 110 are not affected by the automatic time-based routing rules of STPs 107 and 108, the trunking between SSPs 109 and 110 will not occur since an IAM that arrives at STP 107 for a call between network A 101 and network F 106 will not be allowed to pass when a routing rule for routing messages between networks A and F 101 and 106 expires. By providing a mechanism to automatically remove or disable routes in an STP, the subject matter described herein alleviates network operators from the cumbersome administration of adding and removing routing data when service agreements expire.

Figure 2:
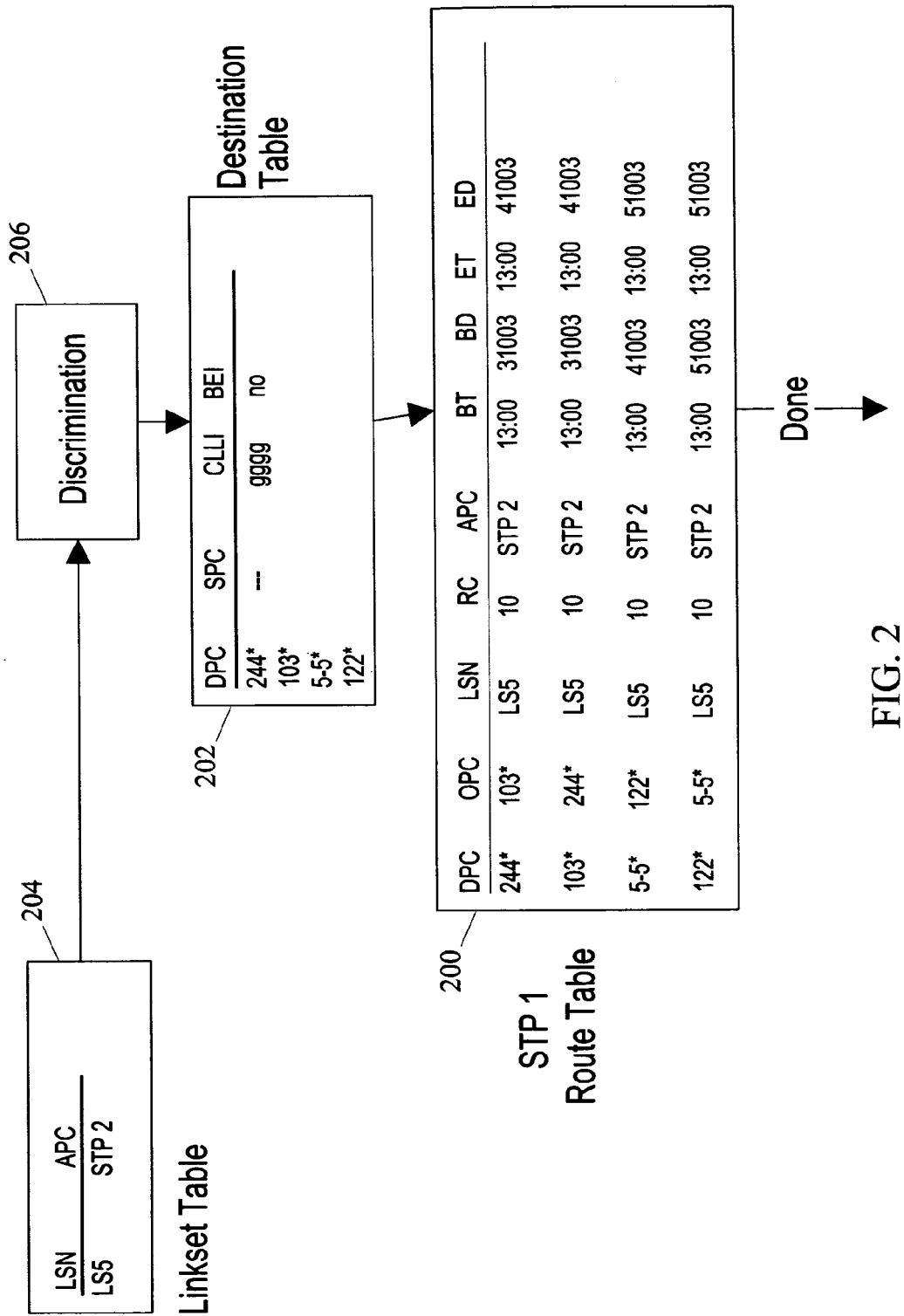
FIG. 2 is a block diagram illustrating a time-based route table structure suitable for use in a signal transfer point according to an embodiment of the subject matter described herein.

FIG. 2 illustrates a time-based routing rule data structure that may be included in an STP according to an embodiment of the subject matter described herein. In FIG. 2, the time based routing data structure includes a route table 200, a destination table 202, and a linkset table 204. Route table 200 includes entries keyed by OPC and DPC values. The values stored in the OPC and DPC fields correspond to the network point codes illustrated within the network A-F clouds in FIG. 1. Each entry in route table 200 also includes a linkset name (LSN) field, a route cost (RC) field, and an adjacent point code (APC) field. In order to implement time-based routing rules, each entry includes a begin time field (BT), a begin date (BD) field, an end time (ET) field, and an end date (ED). The begin time, begin date, end time, and end date fields define a time period during which the route table entry is valid. When a message whose OPC and DPC matches an entry is received within the time period, the message may be routed using the entry. If a message is received outside of the time period specified by the entry, the message may be discarded or sent over an alternate route. For example, route table 200 may include a default route for at least some of the time-based routes to prevent calls from being dropped. The default route may correspond to a low-speed bearer channel for the call. The default route may be utilized when all of the time-based routes for a particular set of parameters have expired or are not in service. Entries for default routes may have blank or null values stored in the start and end time fields.

Destination table 202 stores DPC and other values used by discrimination function 206 to identify messages that should be through-switched. Linkset table 204 stores linkset name (LSN) and corresponding adjacent point code (APC) values. A lookup in route table 200 results in a linkset name. That name is used to perform a lookup in linkset table 204 to identify an outbound signaling link for a message.

As the first entry in route table 200 of FIG. 2 shows, prior to 1:00 pm on Mar. 10, 2003 when the service agreement starts, network 101 A (represented by point code 244) cannot reach network F 106 (represented by point code 103) via transit network 100. During the 1-month period between March 10 and April 10, network A 101 and network F 106 can connect through transit network 100. On April 10 at 1:00 pm, the routing data for routes between networks A and F 101 and 106 in STPs 107 and 108 is inhibited, and an MSU will not be allowed to pass as its timestamp is not between the begin time/date and end time/date. In this example, the routing data may be inhibited instead of deleted so the operator of transit network 100 can review past routing data agreements and either manually delete the data or manually change the time period if the agreement is re-activated. Any suitable data retrieval mechanisms may be provided in transit network 100 for re-activating time-based routing rules. For example STPs 107 and 108 may each include a provisioning interface that allows data within their respective route table to be altered. STPs 107 and 108 may include an ∞ (infinite time) designator in the BT/BD and ET/ED fields to designate permanent routing logic.

As indicated above, a routing function that implements automatic time-based routing rules may utilize both the OPC and DPC in a received message when performing a route table lookup as DPC routing alone would not allow the transit network operator to perform the network-network discrimination that would be required. If only DPC routing were supported in STPs 107 and 108, the transit network operator could only provide unlimited access or no access at all to a particular network. Thus, using time-based routing rules and OPC-DPC routing, as business agreements are made and expire, the transit network operator can effectively control access to his network based upon the agreements. However, providing an STP with time periods assigned to OPC-only or DPC-only route table entries is intended to be within the scope of the subject matter described herein. Furthermore, additional signaling message parameters including, but not limited to, a circuit identification code (CIC) parameter and a service indicator (SI) parameter may be used when performing a time-based routing rule table lookup. For example, by including an SI parameter in the time-based routing rule table lookup, selective time-based routing of ISUP and SCCP messages may be accomplished. This includes ISUP and SCCP messages that have been formatted for transport via an Internet protocol (IP) link using an SS7-IP adaptation protocol such as Internet Engineering Task Force (IETF) SIGTRAN M3UA, SUA, and other functionally similar protocols.

Figure 3:
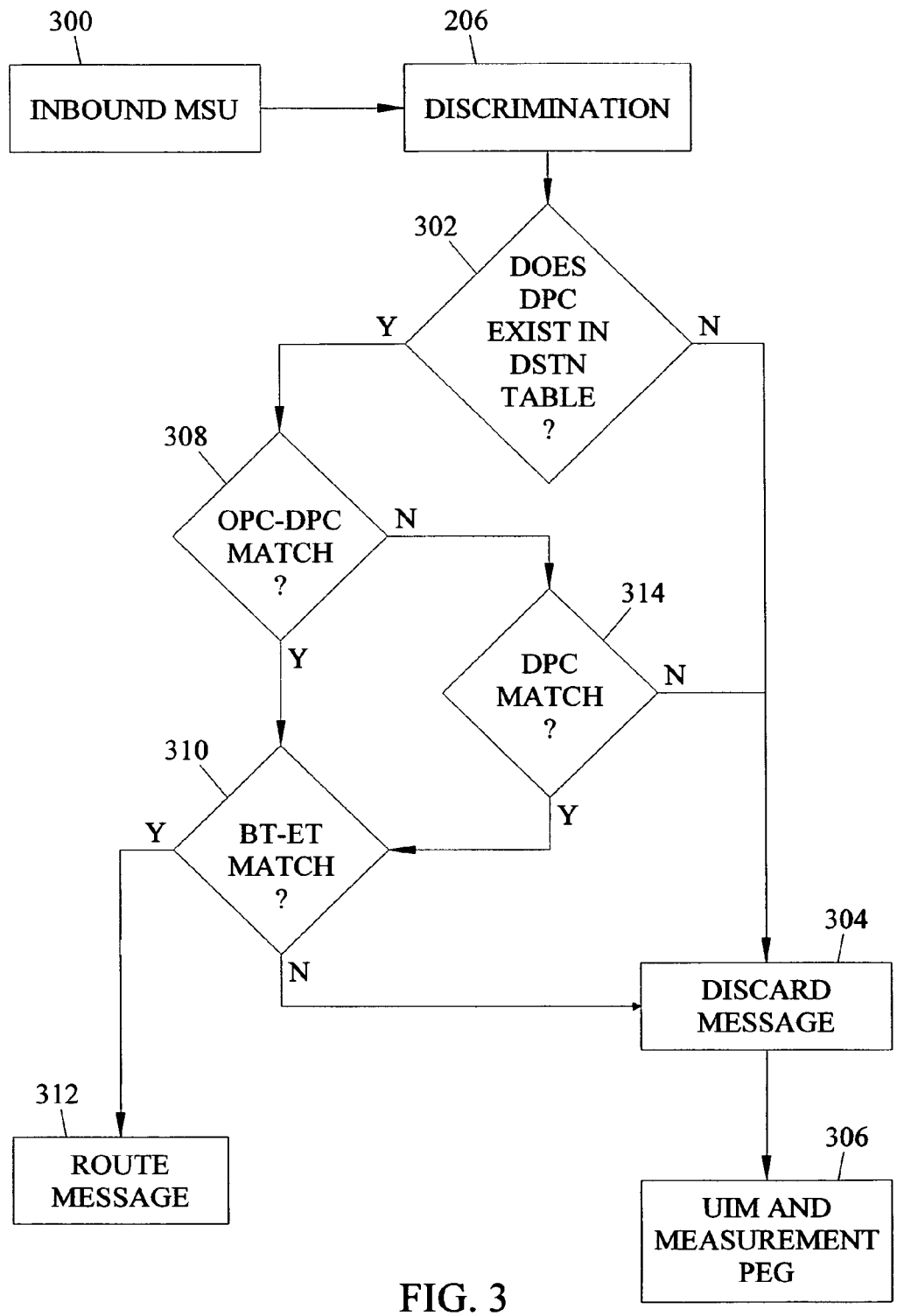
FIG. 3 is a flow chart illustrating exemplary steps that may be performed by a network routing node, such as an STP, and performing time-based routing according to an embodiment of the subject matter described herein.

FIG. 3 is a process flow diagram that illustrates exemplary message routing processing by an STP that implements automatic time-based routing rules according to an embodiment of the subject matter described herein. In FIG. 3, a message 300 is received by the STP node and discrimination function 206 is invoked to determine whether the message is valid and should be allowed into the switch for routing processing. If the message passes discrimination screening and the message is destined for a point code other than that of the STP, routing processing is performed on the message. In step 302, a destination point code (DPC) parameter is extracted from the message and used to search a DPC field in destination table 202. If there is no matching DPC in destination table 202, the message may be discarded (step 304) and/or an error routine invoked (step 306).

If a matching entry is located in destination table 202, control proceeds to step 308 where route table 200 is searched first using a complex search key that includes the OPC and DPC values extracted from the message. If a matching entry is located in route table 200, in step 310, the routing rule enforcement period fields (i.e., beginning time (BT) and ending time (ET)) are checked to determine if the matching routing rule is in effect. If the matching routing rule is in effect (i.e., has begun, but has not expired), control proceeds to step 312 where the message is routed using the matching routing rule. If the matching routing rule has not been placed in effect or has expired, then one of several processing paths may be followed. For example, if the matching routing rule has not been placed in effect or has expired, the search of route table 200 may be continued until another matching entry is located or the end of route table 200 is reached. Alternatively, if the matching routing rule has not been placed in effect or has expired, the message may simply be discarded (step 304), and/or an error routine may be invoked (step 306).

Returning to step 308, if a matching entry is not located using the complex search key, control proceeds to step 314 where a second search may be performed using a simple search key including the DPC value extracted from the message. In a manner similar to that described above with respect to the complex key lookup, if a matching entry is located in the route table, control proceeds to step 310 where the routing rule enforcement period fields (i.e., beginning time (BT) and ending time (ET)) are checked to determine if the matching routing rule is in effect. If the matching routing rule is in effect (i.e., has begun, but has not expired), control proceeds to step 312 the message is routed using the matching routing rule. If the matching routing rule has not been placed in effect or has expired, then one of several processing paths may be followed. For example, if the matching routing rule has not been placed in effect or has expired, the search of route table 200 may be continued until another matching entry is located or the end of route table 200 is reached. Alternatively, if the matching routing rule has not been placed in effect or has expired, the message may simply be discarded (step 304), and/or an error routine may be invoked (step 306).

The subject matter described herein is not limited to associating a start time and an end time with each route table entry. In an alternate implementation, each time-based entry may include an end time only. In such an implementation, the routing function may determine whether an entry is valid by comparing the current time or timestamp of a received message with the expiration time in the corresponding route table entry.

It should also be noted that the subject matter described herein is not limited to associating a time period with each entry in the route table. Some routing entries may be permanent and may not have an associated expiration time. In a route table that includes entries with and without expiration times, time-based routing may include determining whether an entry corresponding to a received message has an expiration time.

According to yet another aspect of the subject matter described herein, a routing function associated with routing processing may periodically scan the route table and automatically remove any routing rule entries that have expired. Upon removal of an expired routing rule, the routing function may generate and transmit a routing rule status alert message to a network administration system or an administrator, thereby providing notice that a route has expired. In a similar manner, the routing function may generate and transmit a routing rule status alert message to a network administration system or system administrator when a new routing rule becomes active or takes effect, thereby providing notice that a new route has activated.

Automatic time-based routing according to the present invention may be applied to non-SS7 types of signaling networks, including IP telephony signaling networks, such as SIP and H.323 signaling networks. In the case of a SIP proxy routing node implementation, a route table according to an aspect of the subject matter described herein may contain some or all of the exemplary information presented below in Table 1. Message routing processing, with respect to the route table, is similar to that described above. Instead of destination and origination point codes, called and calling SIP uniform resource locator (URL) values are used, and instead of an SS7 linkset, a SIP virtual trunk group, UDP/IP socket, TCP/IP socket, or SCTP/IP association may be specified. One advantage of the subject matter described herein is the ability to specify a life span for each routing rule in the route table. A routing function may either check the activation/expiration status of a selected rule in the table prior to use, and/or the routing function may simply remove routing rule entries from the table as they expire.

TABLE 1

| | | SIP Routing Data | | | | | |
|---|---|---|---|---|---|---|---|
| Called SIP URL | Calling SIP URL | SIP Virtual Trunk Group, UDP/IP Socket, SCTP/IP Association | Route Cost | BT | BD | ET | ED |
| @Tekelec.com | @IEX.com | Sock2 | 10 | 1300 | 31003 | 1300 | 41003 |

Figure 4:
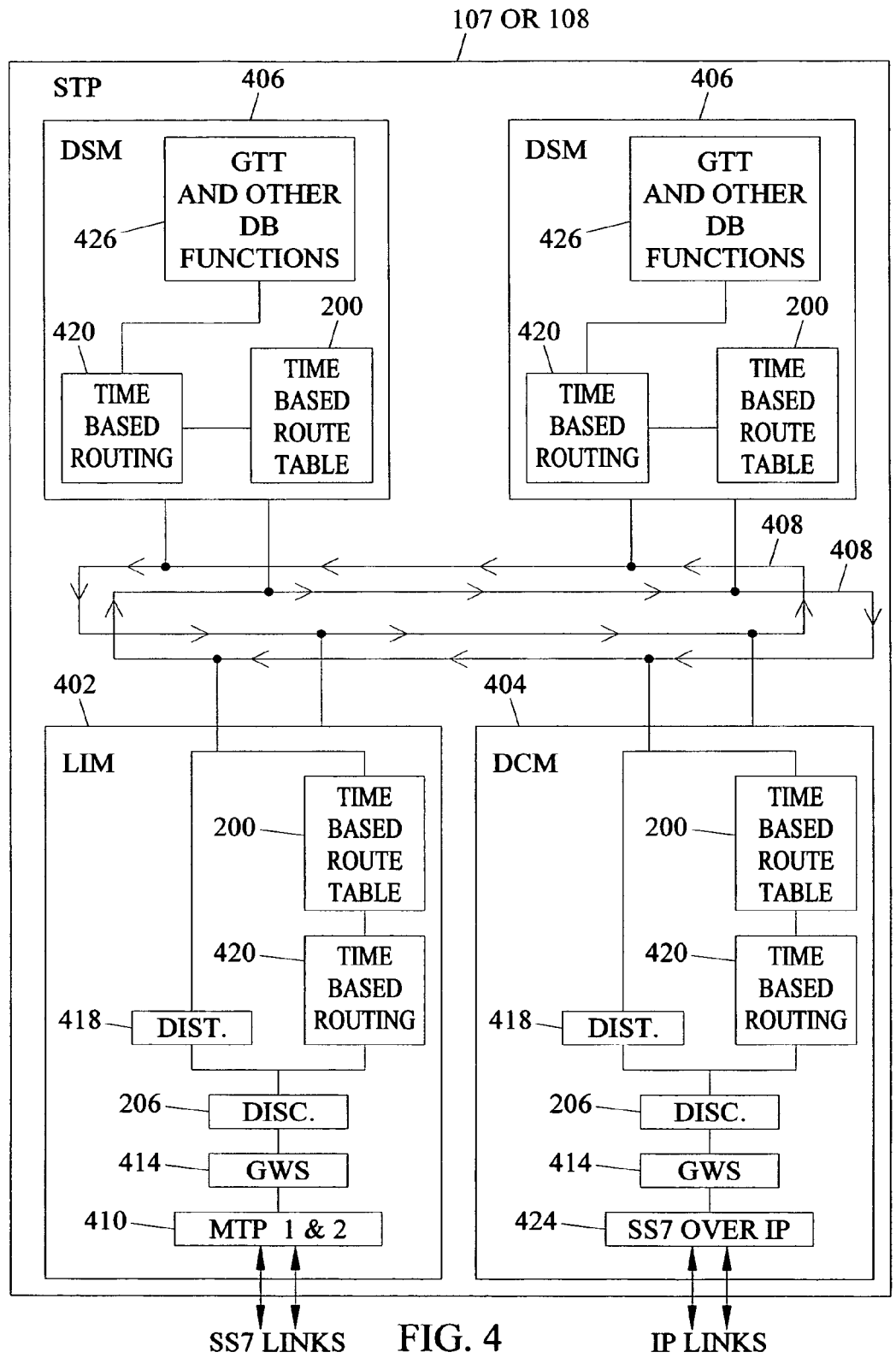
FIG. 4 is a block diagram illustrating functions within an STP for implementing time-based routing according to an embodiment of the subject matter described herein.

As stated above, automatic time-based routing rules may be implemented in any suitable network node, such as an STP. FIG. 4 illustrates an STP with automatic time-based routing rules according to an embodiment of the subject matter described herein. Referring to FIG. 4, STP 107 or 108 includes a plurality of modules 402, 404, and 406 for performing SS7 signal transfer and database-related functions. In the illustrated example, STP 107 or 108 includes a link interface module 402, a data communications module 404, and database service modules 406. From a hardware perspective, each module includes an application processor for executing telecommunications routing and database related applications and the communications processor for communicating with other processing modules via bus 408.

From a software perspective, link interface module 402 includes functions for sending and receiving messages over SS7 signaling links. In FIG. 4, these functions include MTP level 1 and 2 function 410, gateway screening function 414, discrimination function 206, distribution function 418, time-based routing function 420, and a time-based route table 200. MTP level 1 and 2 function 410 performs MTP level 1 and 2 functions, such as error detection, error correction, and message sequencing. Gateway screening function 414 performs screening of inbound signaling messages based on destination and/or originating point codes in the signaling messages to determine whether or not to route the messages in the network. Discrimination function 206 determines whether received signaling messages are intended for an internal subsystem within STP 107 or 108 or whether the messages are to be through switched. For messages that are intended for an internal subsystem, discrimination function 206 forwards the messages to distribution function 418. For messages that are to be through switched, discrimination function 206 forwards the messages to time-based routing function 420. Time-based routing function 420 performs time-based routing of SS7 signaling messages based on time-based routing data stored in time-based route table 200.

DCM 404 includes hardware and software for sending and receiving SS7 and IP telephony signaling messages over IP signaling links. In the illustrated example, DCM 404 includes SS7 over IP layers 424 for sending SS7 messages over IP links. SS7 over IP layers 424 may include physical layer functions, network layer functions, transport layer functions, and SS7 adaptation layer functions. The remaining functions in DCM 404 are the same as those in LIM 402. Hence a description thereof will not be repeated herein.

DSMs 406 include database-related functions 426, such as GTT and LNP translation functions. After these functions are performed for received signaling messages, DSMs 406 route the messages using time-based routing function 420 and time-based route table 200 as described with regard to LIM 402. Such routing tables enable time-based routing agreements between carriers to be easily implemented and managed, as described above.

In the architecture illustrated in FIG. 4, each module includes its own copy of route table 200. Such an architecture distributes the routing processing among multiple processors and reduces the likelihood of a processor becoming overloaded due to routing processing. However, the subject matter described herein is not limited to such an architecture. In an alternate implementation, routing processing may be implemented on one or more centralized routing modules coupled to the link interface module via a bus. In such an implementation, the routing function and the route table may be located on the centralized routing module. The link interface module may forward messages that require routing to the centralized routing module for routing processing. The centralized routing module may perform time-based routing, as described above.

Thus, the subject matter described herein includes a network routing node, such as an STP, that implements time-based routing rules. Such a node allows agreements to be implemented between a transit carrier and other carriers for specified time periods without requiring manual updating of route table entries. As a result, the subject matter described herein greatly decreases the time and labor required to administer time-based routing agreements.

The subject matter described herein is not limited to using time-based routing rules to implement agreements between carriers. The time-based routing rules and the time-based routing functions described above may be used to implement any suitable time-based routing policy. For example, the time-based routing rules and the time-based routing functions may be used to route traffic over high-speed routes during busy times of day and over low speed routes during other times to more effectively utilize network bandwidth.

It should be noted that the subject matter described herein can be used to implement both one-way and two-way time-based routing agreements. For example, a transit carrier that implements automated time-based routing according to the subject matter described herein can enter an agreement to route traffic from a first carrier's network to a second carrier's network but not from the second carrier's network to the first carrier's network. In such a situation, the second carrier would be required to find an alternate route back to the first carrier's network. In a two-way time-based routing arrangement, an automated time-based routing function according to the subject matter described herein may be configured to route messages in both directions between the first and second carriers' networks. One-way and two-way time-based routing agreements can be implemented by entering the appropriate OPC, DPC, and time values in the route table.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for implementing time-based routing rules in a network routing node, the method comprising:
   at each module of a plurality of modules in a network routing node, wherein the network routing node is a signaling transfer point having a distributed routing architecture and is configured to distribute routing processing of signaling messages among the modules, wherein each module includes a memory for storing routing data, a processor, and a routing function executable by the processor for:
   (a) storing, in the memory of the module, routing data for routing signaling messages between a source address and a destination address;
   (b) associating a time period with the routing data;
   (c) routing signaling messages from the source address to the destination address during the time period; and
   (d) automatically inhibiting the routing of signaling messages from the source address to the destination address outside of the time period, wherein the time period corresponds to a time period specified by a service agreement between network operators.

2. The method of claim 1 wherein storing routing data includes storing routing data for routing SS7 messages between SS7 destinations.

3. The method of claim 1 wherein storing routing data includes storing Internet (IP) telephony routing data for routing IP telephony signaling messages between IP telephony destinations.

4. The method of claim 1 wherein associating a time period with the routing data includes associating a start time and an end time with the routing data.

5. The method of claim 1 wherein associating a time period with the routing data includes associating an expiration time with the routing data.

6. The method of claim 1 wherein associating a time period with the routing data includes associating a time period with a first route table entry concerning a route from the source address to the destination address.

7. The method of claim 6 wherein associating a time period with the routing data includes associating a time period with a second route table entry concerning a route from the destination address to the source address.

8. The method of claim 1 wherein associating a time period with the routing data includes associating a first time period first route table entry for routing traffic from the source address to the destination address over a high speed route during the first time period and associating a second time period with a second route table entry for routing traffic from the source address to the destination address over a low speed route during the second time period.

9. The method of claim 1 wherein routing messages from the source address to the destination address includes routing SS7 messages from the source address to the destination address.

10. The method of claim 1 wherein routing messages from the source address to the destination address includes routing IP telephony signaling messages from the source address to the destination address.

11. The method of claim 1 wherein automatically inhibiting the routing of messages from the source address to the destination address includes checking the time period associated with the routing data and dropping messages in response to determining that the current time is not within the time period.

12. The method of claim 1 wherein automatically inhibiting the routing of messages includes periodically scanning a network routing table for expired entries and deleting the expired entries.

13. The method of claim 1 wherein steps (a)-(d) are implemented in an SS7 signal transfer point.

14. The method of claim 1 wherein steps (a)-(d) are implemented in a signal transfer point including SS7/IP gateway functionality.

15. The method of claim 1 wherein steps (a)-(d) are implemented in an IP telephony signaling router.

16. The method of claim 1 wherein inhibiting routing messages from the source address to the destination address includes inhibiting routing of messages from the source address to the destination address over a first route and, in response to inhibiting routing of message over the first route, routing the messages from the source address to the destination address over a default route.

17. A network routing node including automatic time-based routing rule administration capabilities, wherein the network routing node is a signaling transfer point having a distributed routing architecture and is configured to distribute routing processing of signaling messages among a plurality of modules in the network routing node, the network routing node comprising:
  (a) a link interface module for sending and receiving signaling messages via external signaling links, the link interface module being one of the plurality of modules in the network routing node;
  (b) a route table stored in memory of the link interface module including route table entries for routing signaling messages received by the network routing node, wherein at least one of the entries includes a time period; and
  (c) a routing function executable by a processor of the link interface module and operatively associated with the route table for routing the signaling messages receiving by the network routing node from the source address to the destination address during the time period associated with the routing data and for automatically inhibiting the routing of signaling messages from the source address to the destination address outside of the time period, wherein the time period corresponds to a time period specified by a service agreement between network operators.

18. The network routing node of claim 17 wherein the link interface module comprises an SS7 link interface module.

19. The network routing node of claim 17 wherein the link interface module comprises an IP link interface module.

20. The network routing node of claim 17 wherein the route table comprises an SS7 route table including entries for routing SS7 signaling messages between SS7 nodes.

21. The network routing node of claim 17 wherein the route table comprises an Internet protocol (IP) telephony route table including entries for routing IP telephony signaling messages between IP telephony nodes.

22. The network routing node of claim 17 wherein the time period includes a start time and an end time defining a valid time period for the at least one entry.

23. The network routing node of claim 17 wherein the at least one entry includes an end time defining an expiration time for the at least one entry.

24. The network routing node of claim 17 wherein the at least one entry includes a first entry indexed by a source address and the time period defines a time during which messages from the source address will be routed.

25. The network routing node of claim 17 wherein the at least one entry includes a first entry indexed by a destination address and the time period defines a time during which messages to the destination address will be routed.

26. The network routing node of claim 17 wherein the at least one entry includes a first entry indexed by a first address in a source address field and a second address in a destination address field and the time period includes a first time period defining a time during which messages will be routed from the first address to the second address.

27. The network routing node of claim 26 wherein the at least one entry includes a second entry indexed by the first address in the destination address field and the second address in the source address field and a second time period defining a time during which messages will be routed from the second address to the first address.

28. The network routing node of claim 17 wherein the routing function is adapted to ignore the routing data in response to expiration of the time period.

29. The network routing node of claim 17 wherein the routing function is adapted to automatically scan the route table for expired entries and to delete the expired entries.

30. The network routing node of claim 17 wherein the signal transfer point includes SS7/IP gateway capabilities.

31. The network routing node of claim 17 wherein the link interface module, the routing function, and the route table are components of an IP telephony signaling router.

32. The network routing node of claim 17 wherein the routing function is located on the link interface module.

33. The network routing node of claim 17 comprising a centralized routing module operatively associated with the link interface module, wherein the routing function is located on the centralized routing module.

34. A computer program product comprising computer-executable instructions embodied in a non-transitory computer-readable medium for performing steps comprising:
  at each module of a plurality of modules in a network routing node, wherein the network routing node is a signaling transfer point having a distributed routing architecture and is configured to distribute routing processing of signaling messages among the modules, wherein each module includes a memory for storing routing data, a processor, and a routing function executable by the processor for:
  (a) receiving, at the module, a signaling message including a source address and a destination address;
  (b) performing a lookup in a route table stored in the memory of the module and locating a routing rule corresponding to at least one of the source address and the destination address,
  (c) determining whether the routing rule has an associated time period;
  (d) in response to determining that the routing rule has an associated time period, determining whether the signaling message was received outside of the time period;
  (e) in response to determining that the message was received outside of the time period, inhibiting routing of the signaling message from the source address to the destination address, wherein the time period corresponds to a time period specified by a service agreement between network operators; and (f) in response to determining that the message was received within the time period, routing the signaling message to the destination address.

35. The computer program product of claim 34 wherein receiving a signaling message including a source address and a destination address includes receiving a signaling message including an SS7 originating point code (OPC) and a destination point code (DPC).

36. The computer program product of claim 35 wherein performing a lookup in a route table includes performing a lookup based on the OPC and the DPC.

37. The computer program product of claim 34 wherein determining whether the signaling message was received outside of the time period includes comparing a timestamp associated with the signaling message to the time period.

38. The computer program product of claim 34 wherein inhibiting routing of the signaling message from the source address to the destination address includes dropping the signaling message.

39. The computer program product of claim 34 wherein inhibiting routing of the signaling message from the source address to the destination address includes routing the signaling message to an alternate destination address.

* * * * *